United States Patent [19]

Okuno

[11] Patent Number: 5,410,712

[45] Date of Patent: Apr. 25, 1995

[54] COMPUTER SYSTEM EQUIPPED WITH EXTENDED UNIT INCLUDING POWER SUPPLY

[75] Inventor: Takashi Okuno, Tokyo, Japan

[73] Assignee: Kabushiki Kaisha Toshiba, Kawasaki, Japan

[21] Appl. No.: 774,979

[22] Filed: Oct. 15, 1991

[30] Foreign Application Priority Data

Oct. 16, 1990 [JP] Japan .................. 2-275350
Oct. 19, 1990 [JP] Japan .................. 2-278915

[51] Int. Cl.⁶ ............................................. G06F 1/26
[52] U.S. Cl. ................................. 395/750; 395/575; 364/273; 364/273.2; 364/273.3; 364/DIG. 1
[58] Field of Search ............. 395/750, 575; 364/707, 364/273, 273.2, 273.3, DIG. 1, 948.6, 948.7, 948.9, DIG. 2, 708.1; 371/66, 14, 12

[56] References Cited

U.S. PATENT DOCUMENTS

| | | | |
|---|---|---|---|
| 4,377,000 | 3/1983 | Staab | 371/11 |
| 4,654,818 | 3/1987 | Wetterau | 364/900 |
| 4,747,041 | 5/1988 | Engel et al. | 395/750 |
| 4,894,792 | 1/1990 | Mitchell et al. | 364/708.1 |
| 4,903,222 | 2/1990 | Carter et al. | 364/708.1 |
| 4,907,150 | 3/1990 | Arroyo et al. | 364/200 |
| 4,980,836 | 12/1990 | Carter et al. | 364/483 |
| 4,991,058 | 2/1991 | Watkins et al. | 361/391 |
| 5,021,983 | 6/1991 | Nguyen et al. | 364/707 |
| 5,110,226 | 5/1992 | Sherman et al. | 400/88 |
| 5,126,910 | 6/1992 | Windsor et al. | 361/42 |
| 5,133,076 | 7/1992 | Hawkins et al. | 395/800 |
| 5,148,042 | 9/1992 | Nakazoe | 307/65 |
| 5,151,992 | 9/1992 | Nagae | 395/750 |
| 5,239,495 | 8/1993 | Nanno et al. | 364/707 |
| 5,301,334 | 4/1994 | Horiuchi | 395/750 |

FOREIGN PATENT DOCUMENTS

| | | |
|---|---|---|
| 0149762 | 7/1985 | European Pat. Off. ....... G06F 1/00 |
| 0281999 | 9/1988 | European Pat. Off. |
| 2223116 | 3/1990 | United Kingdom . |

OTHER PUBLICATIONS

Desk Station, T3100Sx User's Manual, Toshiba Corporation, Apr. 1900.

Desk Station II, User's Manual, Toshiba Corporation, 1990.

Primary Examiner—Jack B. Harvey
Assistant Examiner—Glenn A. Auve
Attorney, Agent, or Firm—Finnegan, Henderson, Farabow, Garrett & Dunner

[57] ABSTRACT

In a computer system having a resume function, if resume mode is set, and an extended unit is connected to an extended board, when a system power supply is turned on, a power interface outputs to the extended unit a power control signal for interrupting the supply of power from a power supply included in the unit. Hence, various circuits employed in the extended board are not supplied with power from the supply, and hence become inoperative. Accordingly, the system is not affected by the extended board upon its turn-on, irrespective of whether the board is connected to the extended unit.

15 Claims, 7 Drawing Sheets

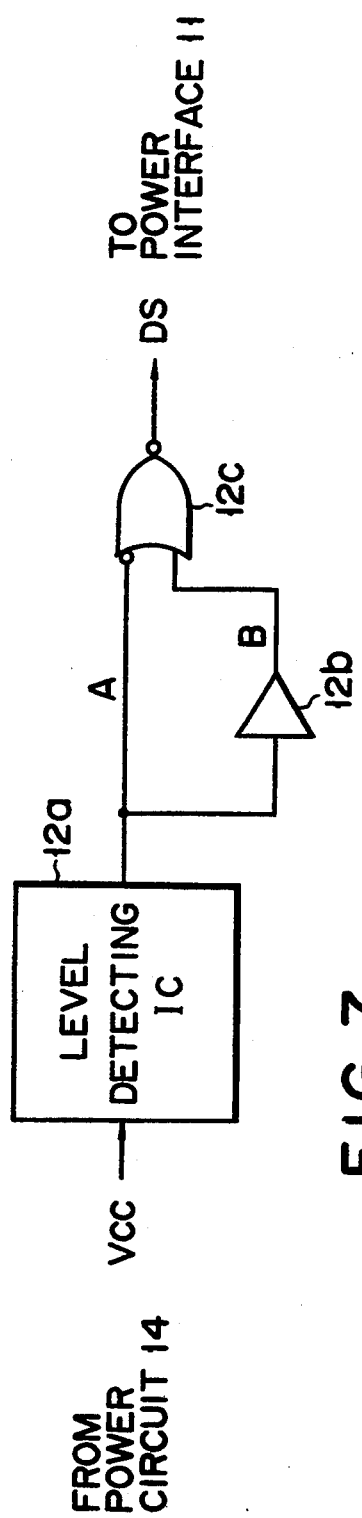
FIG. 7
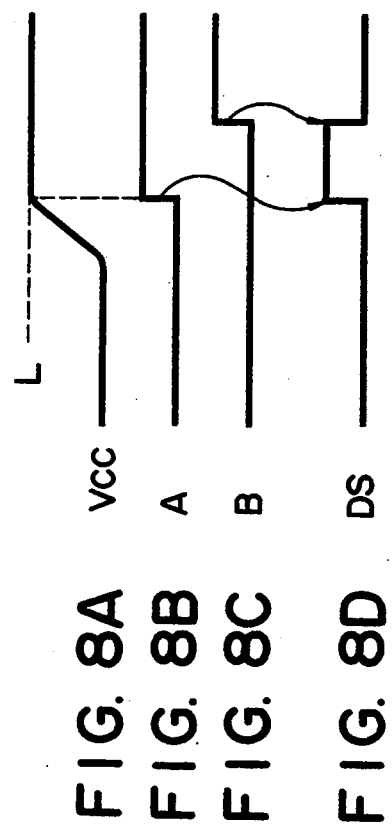
FIG. 8A
FIG. 8B
FIG. 8C
FIG. 8D

COMPUTER SYSTEM EQUIPPED WITH EXTENDED UNIT INCLUDING POWER SUPPLY

BACKGROUND OF THE INVENTION

1. Field of the Invention

This invention relates to a personal computer system having an extended unit for connecting the main body of the system to, for example, an extended memory board, and more particularly, to a computer system having an extended unit including a power supply dedicated thereto.

2. Description of the Related Art

In the field of personal computers, lap-top type computers which are compact, light, and portable are popular. Each of them has standard equipment comprising a system main body, and its peripheral devices such as a keyboard, a liquid crystal display, and a floppy disk. In these compact computers, however, it is not possible to have many standard functions or many input/output devices which enable the system to have various standard functions. For example, the system is not capable of communicating with another computer.

Some of the above-described compact computers are adapted to be connected to an extended unit which allows them to have functions other than standard ones. The extended unit has a slot (connector member) for connecting the system to an extended board incorporating a logic circuit, a memory circuit, etc. The extended unit includes a power source, independent of that of the host system, for driving the logic circuit, memory circuit, etc., in the extended board.

Some personal computers have a resume function of resuming, upon turn-on of the system, the program interrupted by turning off the system. In these computers, when the system, having the resume function, is turned off in a state where the resume mode is set in the setup menu of the system, data registered in various registers and required for effecting the program are stored in a memory (RAM) backed up by a battery dedicated thereto. Then, when the system is turned on again, the stored data are returned to the registers.

In the above computers, there is a case where an extended board set in the extended unit is connected to the system assuming resume mode and storing the data of registers in a memory. In this case, if the system is turned on after the extended unit is connected thereto, and the data stored in the memory are returned to the registers, the data may be damaged due to the connection of the extended unit to the system. This is because the circuits incorporated in the extended board are being driven by the power source included in the extended unit, and hence are communicable with the system. Hence, the data may be changed from that stored immediately before the turn-off of the system, data exchange may be carried out between the system and extended unit without effecting resume mode processing.

SUMMARY OF THE INVENTION

It is the object of the invention to provide a computer system having a resume function and capable of being connected to an extended unit including a power source, in which damage to system data stored by means of resume mode processing can be prevented at the time of turn-on of the system, even when the extended unit is connected to the system.

The computer system of the invention has an extended unit including a power supply for driving various circuits of an extended board which are connected thereto by means of the power supply. The system comprises power circuit means provided in the extended unit, and responsive to power control signals output from the system, for controlling the supply of power from the power supply to the various circuits connected to the extended unit; voltage level detecting means for detecting whether or not the system is turned on; resume mode set means for outputting a resume set signal indicating that the system is in resume mode; and power interface means provided in the system, and responsive to the detection signal from the voltage level detecting means and the resume set signal from the resume mode set means, for outputting the power control signal to the power circuit means so as to interrupt the supply of power from the power supply included in the extended unit.

In the invention, when a resume mode is set in the system, and the system is turned on, the power interface means supplies the extended unit with a power control signal interrupting the supply of power from the power supply included in the extended unit to the extended board. This being so, the circuits employed in the extended board become inoperative. Therefore, even if the extended board is connected to the system, the system can operate without being influenced by the extended board when it is turned on again after it is turned off. Accordingly, data stored by resume mode processing are returned to registers employed in the system, without being damaged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 7 is a block diagram, showing a voltage detecting circuit incorporated in the system of FIG. 1; and FIGS. 8A–8D are timing charts, useful in explaining the operation of the voltage detecting circuit shown in FIG. 7.

DETAILED DESCRIPTION OF THE PREFERRED EMBODIMENTS

The invention will be explained with reference to the accompanying drawings showing an embodiment thereof.

Figure 1:
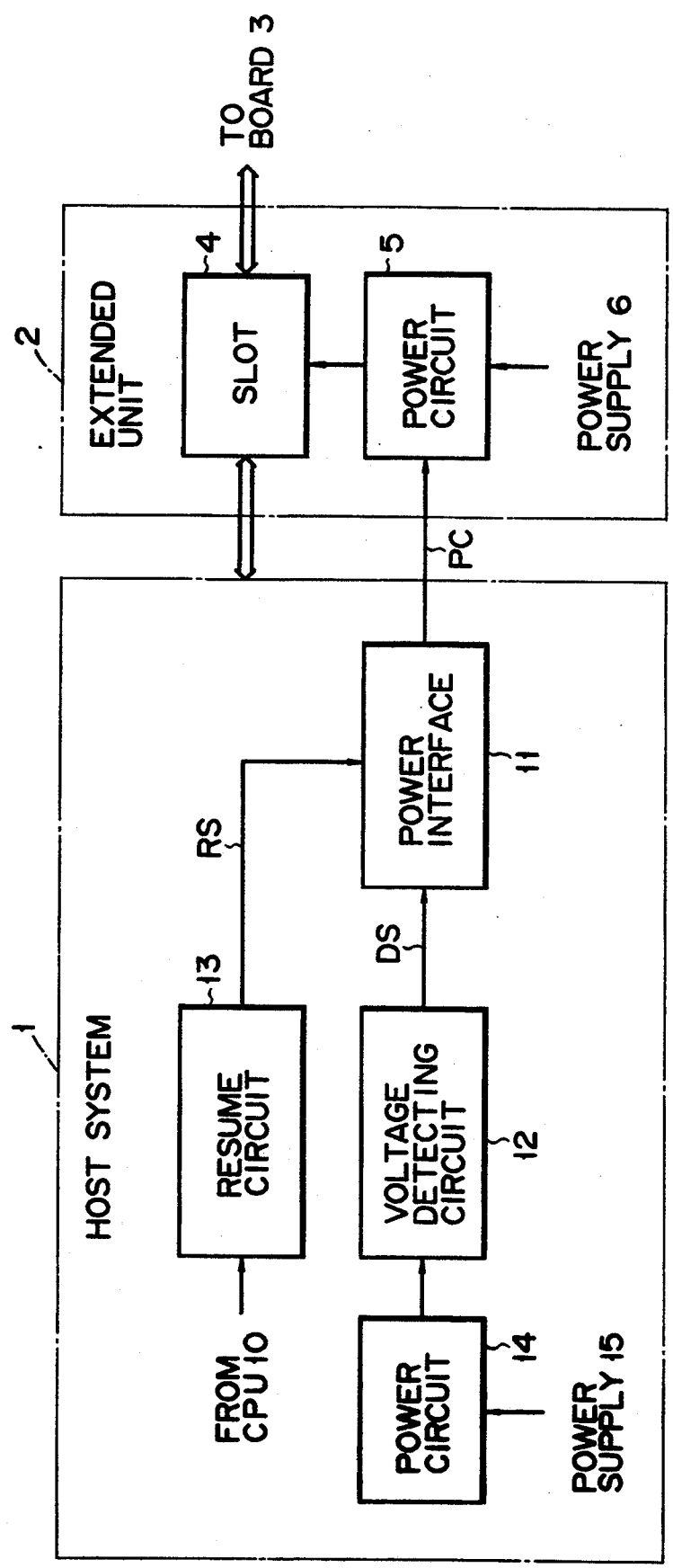
FIG. 1 is a block diagram, showing the basic structure of a computer system according to an embodiment of the invention.

FIG. 1 shows the basic structure of the embodiment. A host system 1 is the main body of, for example, a personal computer, and comprises CPU 10, etc. required for data processing. An extended unit 2 includes a power circuit 5 for driving a slot 4 for connecting the host system 1 to an extended board 3, and for driving various circuits employed in the board 3.

Figure 3:
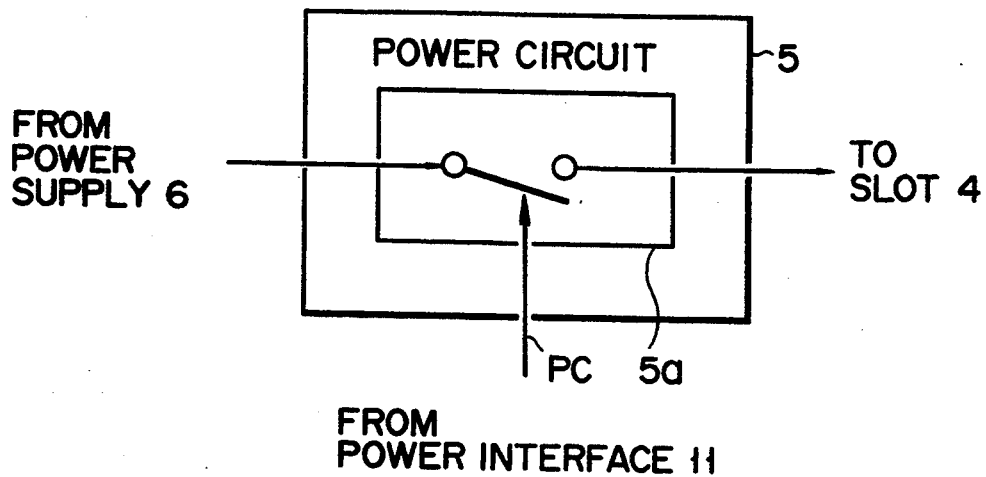
FIG. 3 is a block diagram, showing a power circuit for an extended unit incorporated in the system of FIG. 1.
Figure 4:
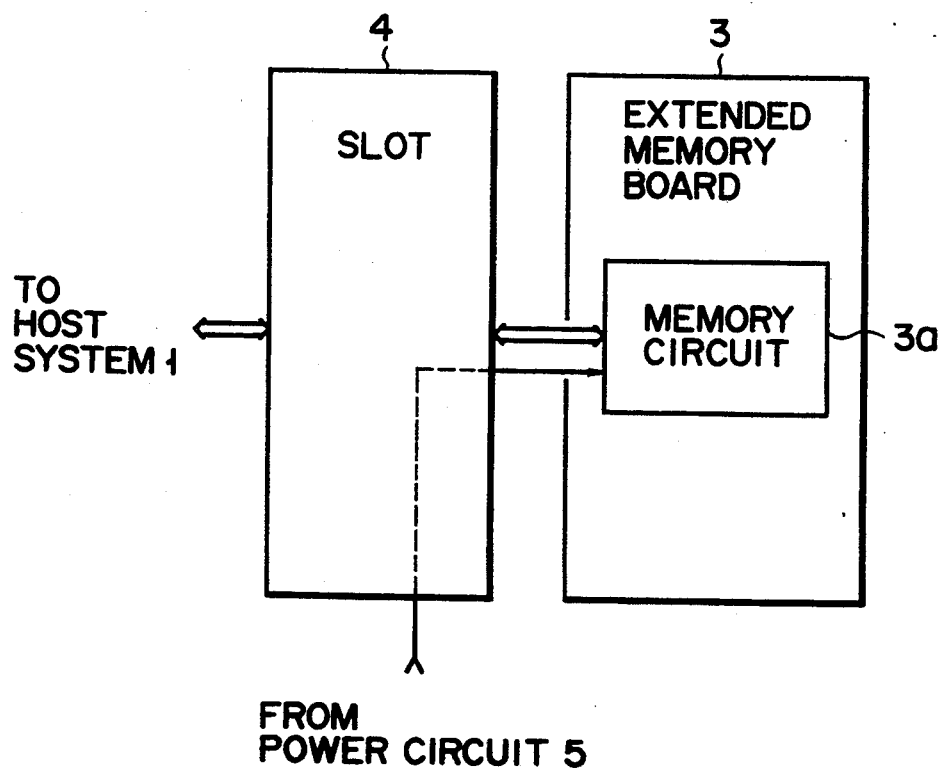
FIG. 4 is a block diagram, showing an extended board incorporated in the system of FIG. 1.

As is shown in FIG. 3, the power circuit 5 of the extended unit 2 has a switch circuit 5a for controlling the supply of power from a power supply 6 included in the unit 2 to the slot 4. As is shown in FIG. 4, the extended board 3 is, for example, an extended memory board, and has a memory circuit 3a. The power circuit 5 supplies power from the power supply 6 to the memory circuit 3a through the slot 4. The extended memory board 3 can be connected to the host system 1 by way of the slot 4 of the extended unit 2, to thereby exchange various data.

As is shown in FIG. 1, the host system 1 has a power interface 11, a voltage detecting circuit 12, and a resume circuit 13, all in accordance with the invention. The power interface 11 outputs a power control signal PC to the power circuit 5. The voltage detecting circuit 12 is a level-detecting IC which detects the voltage level of a power circuit 14 to detect whether a power supply 15 is in an on-state or not, and then supplies a detection signal DS to the power interface 11. The power circuit 14 supplies power from the power supply 15 to various elements incorporated in the host system 1.

Figure 2:
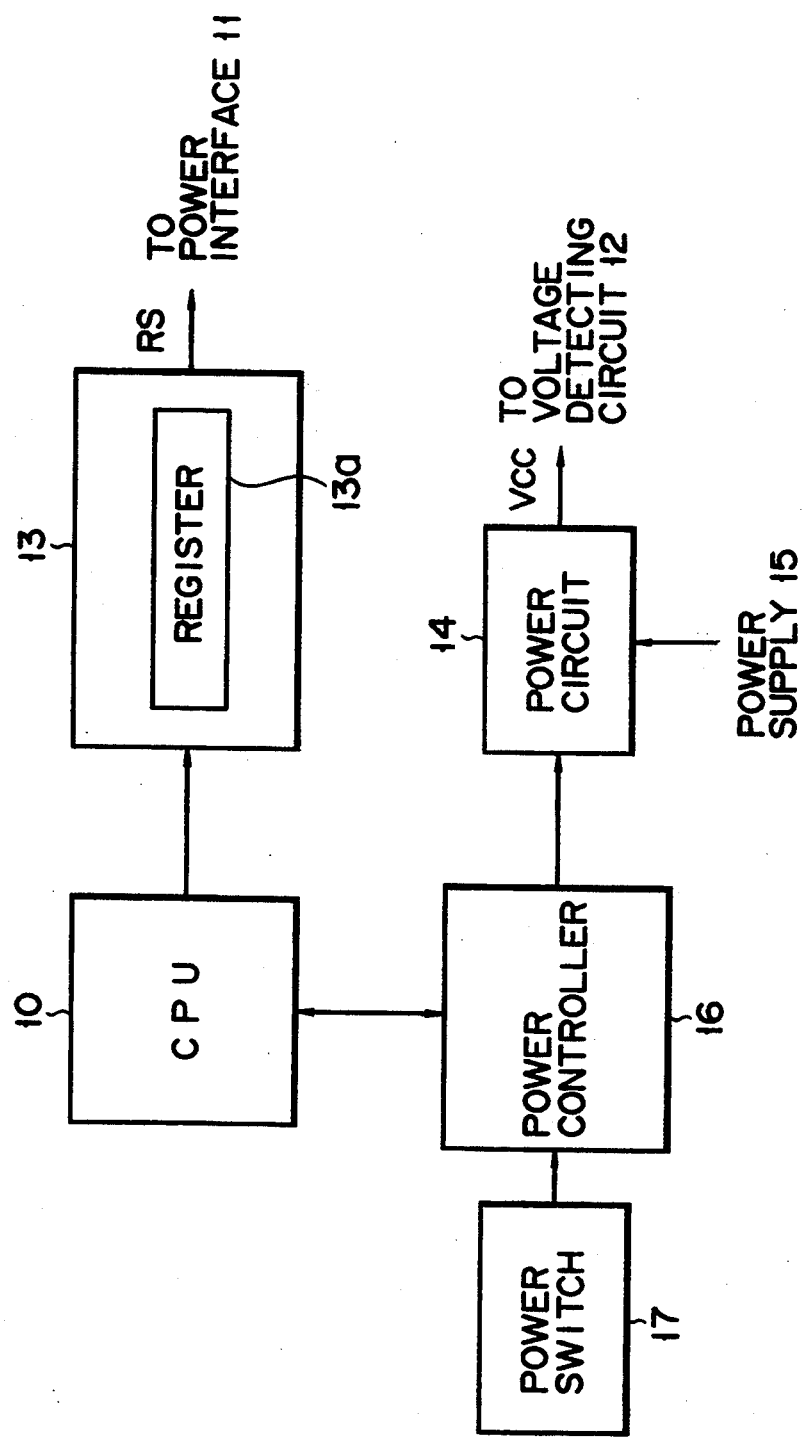
FIG. 2 is a block diagram, showing the main body of the system of FIG. 1.

The resume circuit 13 outputs a resume reset signal RS to the power interface 11 when a resume mode is set in the system 1. As is shown in FIG. 2, the circuit 13 has a register 13a for storing mode set data (of 1 bit) when the resume mode is set by the CPU 10 of the system 1.

Figure 6:
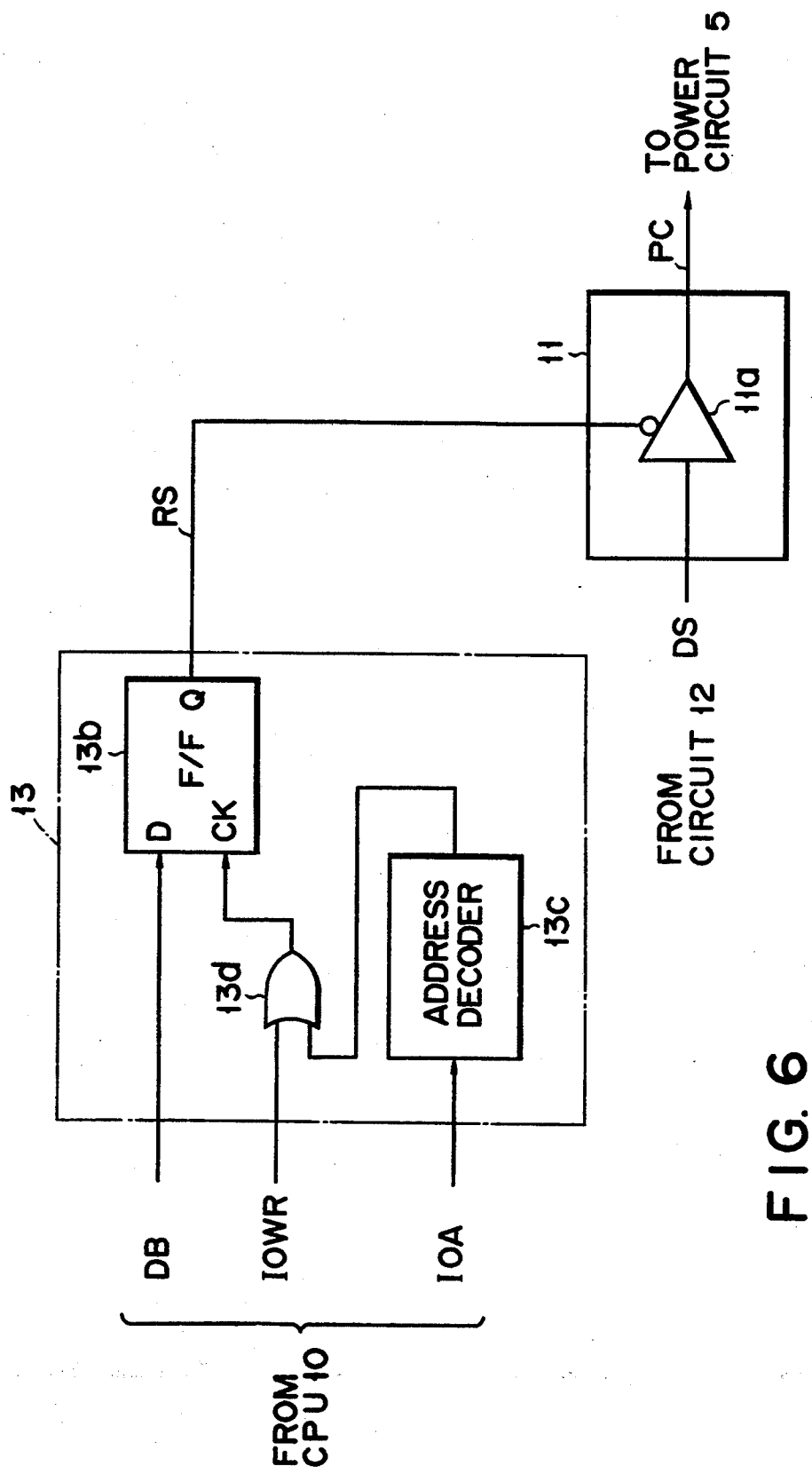
FIG. 6 is a block diagram, showing a resume circuit incorporated in the system of FIG. 1.

More specifically, as is shown in FIG. 6, the register 13a comprises a flip-flop circuit 13b, an address recorder 13c, and an OR-gate 13d. The flip-flop circuit 13b is responsive to a logic level "H" input to its clock terminal CK, for latching mode set data (data bit) DB supplied from the CPU 10, then outputting the resume set signal RS from its output terminal Q. The clock terminal CK of the circuit 13b is supplied with an output signal from the OR-gate 13d, which is supplied with an input/output writing/reading signal IOWR from the CPU 10 and an output signal from the address decoder 13c. The decoder 13c decodes an input/output address signal IOA from the CPU 10.

To effect the resume mode, the CPU 10 stores data, registered in various registers and required for data processing, in a back-up memory, and returns the data once stored in the back-up memory to the registers. At the time of accessing the back-up memory, the CPU 10 outputs the input/output writing/reading signal IOWR and input/output address signal IOA.

As is shown in FIG. 6, the power interface 11 has an output buffer circuit 11a, through which a power control signal PC having the same logic level "H" as the detection signal DS is output to the power circuit 5 of the extended unit 2, in accordance with the resume set signal RS output from the resume circuit 13.

As is shown in FIG. 7, the voltage detecting circuit 12 comprises a level detecting IC (Integrated Circuit) 12a, a delay circuit 12b, and a NOR-gate 12c having an inverted input terminal. As is shown in FIGS. 8A and 8B, the IC 12a outputs a signal A having the same logic level "H" when the level of a power voltage Vcc output from the power circuit 14 is a normal level L. The delay circuit 12b outputs, as is shown in FIG. 8C, a signal B delaying by a predetermined time period from the signal A. The NOR-gate 12c outputs, as is shown in FIG. 8D, the detection signal DS having pulses each rising in synchronism with the rise of the signal A and falling in synchronism with the rise of the signal B.

As is shown in FIG. 2, the power circuit 14 of the host system 1 generates the power voltage Vcc under the control of a power controller 16. The controller 16 has a microprocessor, and detects the operation of a power switch 17, thereby controlling the supply of power to the system. The controller 16 informs the CPU 10 of whether or not the system is on.

Figure 5A:
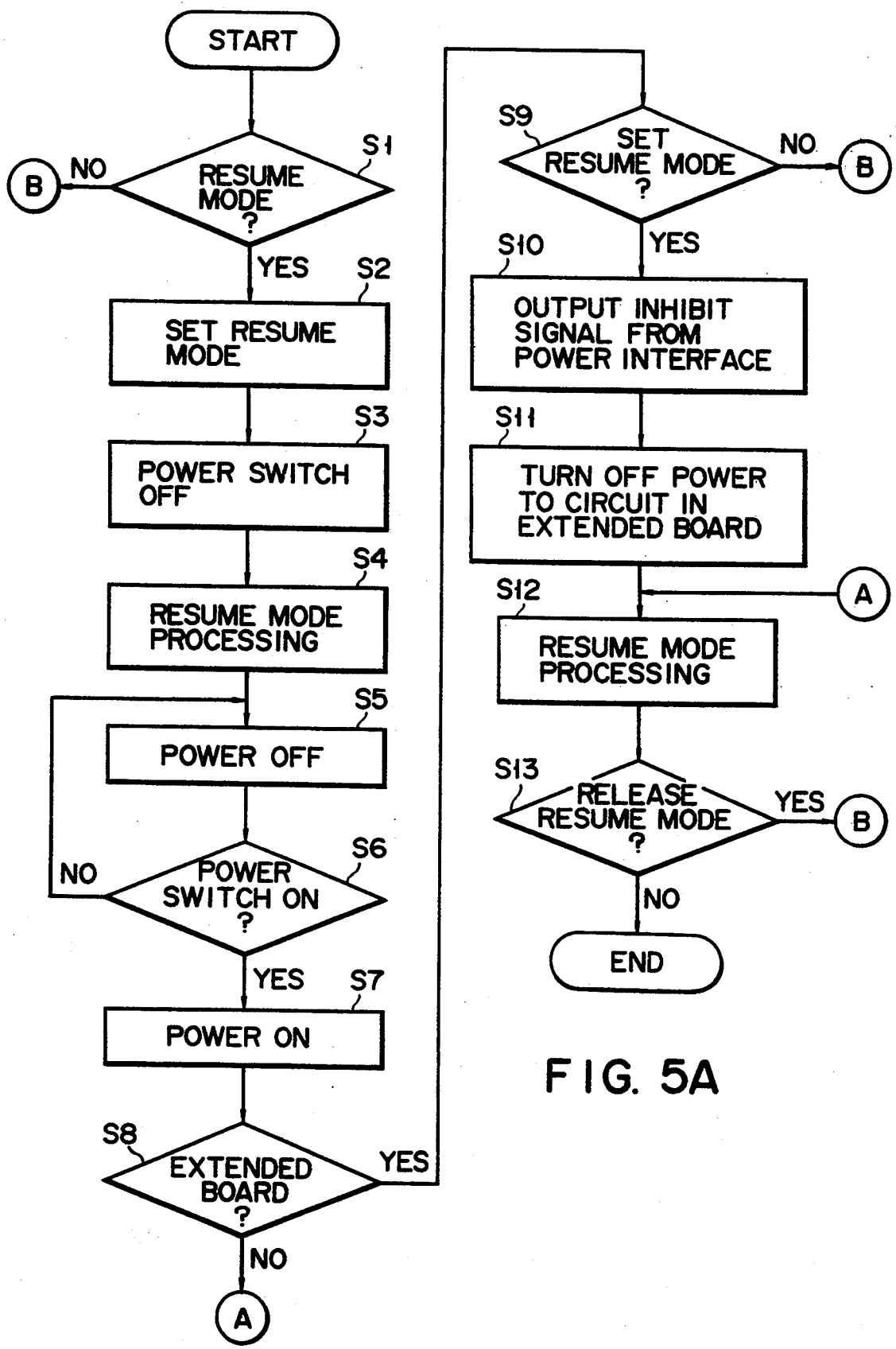
FIGS. 5A and 5B are flowcharts, useful in explaining the operation of the system of FIG. 1.
Figure 5B:
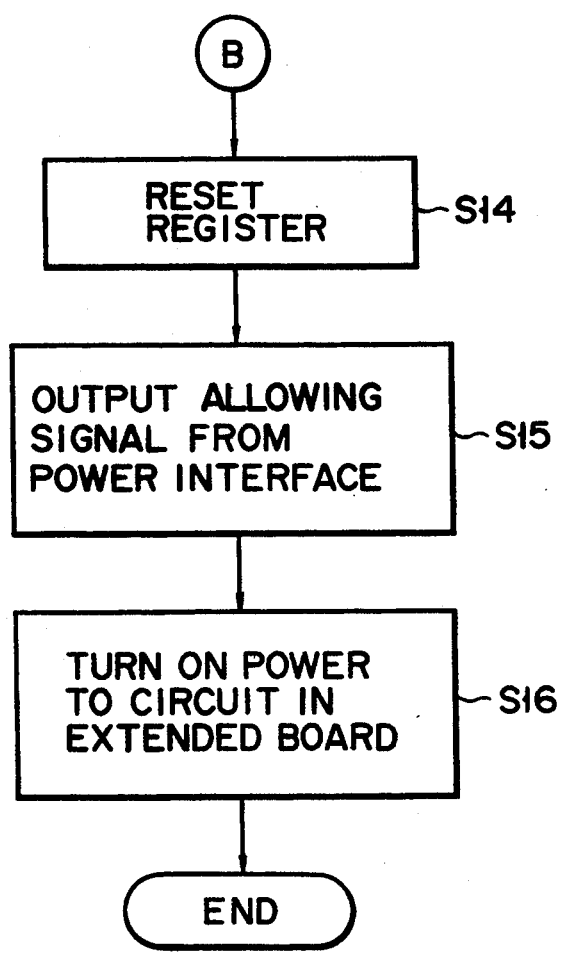

The operation of the embodiment will be explained referring to FIGS. 5A and 5B.

Suppose that the power switch 17 is on, the elements of the host system 1 are supplied with power, and the CPU 10 is in its operative state. In this state, if resume mode is set by the input/output device (not shown) of the host system 1 which comprises a keyboard and a display, i.e., if the answer to the question of a step S1 of FIG. 5A is Yes, a set menu is displayed in the display. Then, if the resume mode in the menu is designated by means of the keyboard, the resume mode is set.

The CPU 10 stores the mode set data DB in the register 13a of the resume circuit 13 upon setting of the resume mode (step S2). Thus, the resume set signal RS is output from the resume circuit 13 to the power interface 11.

Here, if the power switch 17 is turned off (step S3), the power controller 16 informs the CPU 10 of this. The CPU 10 effects resume mode processing (step S4). Specifically, it stores data of various registers, required for data processing, in a back-up memory to which power is supplied by a charging battery dedicated thereto. As is shown in FIG. 6, when the CPU 10 effects the resume mode, the flip-flop circuit 13b of the resume circuit 13 latches the mode set data DB from the CPU 10 (step S2). After the resume mode processing is effected, the power controller 16 controls the power circuit 14, thereby interrupting the supply of power to the system (step S5), and informing the CPU 10 of the interruption.

Thereafter, if the power switch 17 is turned on again, i.e., if the answer to the question of step S6 is yes, the power controller 16 controls the power circuit 14 to supply power to the system (step S7). At this time, the CPU 10 starts to effect various data processings.

As is shown in FIG. 4, in a step S8, the system operates depending upon whether or not the extended board (e.g. memory board) 3 is connected to the slot 4 of the extended unit 2. If the extended board 3 is connected to the same, i.e., if the answer to the question of the step S8 is yes, the memory circuit 3a of the board 3 is supplied with power from the power circuit 5 included in the extended unit 2. Accordingly, the circuit 3a is connected to the host system 1, and data or interface signals are exchanged between them.

Since the resume mode is set in the host system 1 (i.e., the answer to the question of a step S9 is yes), the resume set signal RS is output from the resume circuit 13 to the power interface 11. As is shown in FIGS. 7 and 8D, the voltage detecting circuit 12 supplies the power interface 11 with a detection signal DS having a logic level of "H", when the power voltage vcc from the power circuit 14 reaches a normal level L.

As is shown in FIG. 6, the output buffer circuit 11a of the power interface 11 is controlled by the resume set signal RS, and outputs a power control signal PC having the same logic level "H" as the detection signal DS and serving as an interrupting signal, to the power circuit 5 of the extended unit 2 (step S10).

The power circuit 5 switches off, as is shown in FIG. 3, the switch circuit 5a in accordance with the interrupting signal PC, thereby interrupting the supply of power from the power supply 6, included in the unit 2, to the circuit 3a of the extended board 3, i.e., causing the circuit 3a to be inoperative (step S11).

In this state, the CPU 10 executes the resume mode processing when the system is turned on (step S12). That is, as described above, the CPU 10 returns the data stored in the back-up memory to the registers, thereby enabling itself to resume data processing interrupted by power turn-off.

If the resume mode processing is finished or is removed from the set up menu, i.e., if the answer to the question of a step S13 is yes, the register 13a of the resume circuit 13 is reset (step S14). Thus, the output buffer circuit 11a of the power interface 11 is controlled by the resume set signal RS, and outputs a power control signal PC having a logic level of "L" and serving as an allowing signal, to the power circuit 5 of the extended unit 2 (step S15).

The power circuit 5 switches on the switch circuit 5a in accordance with the allowing signal PC, thereby supplying power from the power supply 6 to the circuit 3a of the extended board 3, i.e., causing the circuit 3a to be operative (step S16). Accordingly, the circuit 3a is connected to the host system 1, and data or interface signals are exchanged therebetween.

As is described above, in a computer system having a resume function, if resume mode is set, resume mode processing, in which data registered in various registers are stored in a back-up memory, is effected when the system is turned off.

Here, if the extended board 3 is connected to the extended unit 2, and the system is turned on, the circuit 3a of the board 3, which is driven by the power supply included in the extended unit 2, can communicate with the host system 1.

In the invention, when the system is turned on in a state in which the resume mode is set, the supply of power from the power supply included in the extended unit 2 is interrupted by using the power control signal PC output from the power interface 11. In this state, the circuit 3a of the extended board 3 connected to the extended unit 2 is inoperative, and hence does not adversely affect the host system. Therefore, during resume mode processing, in which data stored in the back-up memory is returned to various registers upon turn-on of the system, the data are prevented in a reliable manner from being damaged by the circuit 3a. In other words, even if the extended board 3 is connected to the extended unit 2 including a power supply, resume mode processing is carried out upon turn-on of the system, and data processing interrupted by turn-off of the system is resumed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system having a system main body and an extended unit for connecting the system main body to an extended board, the computer system comprising:
    power circuit means provided in the extended unit for controlling a power supply to various circuits employed in the extended board in response to a power control signal output from the system main body;
    voltage level detecting means for detecting a voltage level of a power source for the system main body, and outputting a detection signal indicative of a detection result when the system main body is turned on;
    resume mode set means for outputting a resume set signal indicating that the system main body is in a resume mode; and
    power interface means provided in the system main body for outputting the power control signal to the power circuit means so as to interrupt the power supply to the extended board in response to the detection signal from said voltage level detecting means and the resume set signal from said resume mode set means.

2. The computer system according to claim 1, wherein the resume mode set means has register means for registering a resume set bit when the resume mode is set in the system main body, and resetting the resume set bit when the resume mode is released.

3. The computer system according to claim 2, wherein the resume mode set means has a CPU for setting the resume set bit in the register means in accordance with an instruction from an external device of the system main body, to set the resume mode, and for resetting the register means to release the resume mode.

4. The computer system according to claim 1, wherein the power interface means has an output buffer circuit controlled by the resume set signal output from the resume mode set means, the power interface means outputting a power control signal of a level identical to the detection signal output from the voltage level detecting means when the power interface means receives the resume set signal, thereby interrupting the power supply to the extended board while outputting the power control signal of a normal level when the resume set signal is stopped, thereby allowing the power supply to the extended board.

5. The computer system according to claim 1, wherein the power circuit means provided in the extended unit has a switch circuit for allowing and interrupting the power supply to the extended board, in accordance with the power control signal.

6. The computer system according to claim 1, wherein the power interface means outputs to the power circuit means a signal for interrupting the power supply to the extended board in accordance with the resume set signal and detection signal, and outputs to the power circuit means a signal for allowing the power supply to the extended board when the resume mode is released.

7. The computer system according to claim 1, further comprising a power controller, a power switch, and a CPU for effecting resume mode processing, the power controller turning on the system main body when the power switch is turned on, turning off the system main body when the power switch is turned off, and informing the CPU of whether the system main body is on or off, the CPU effecting the resume mode processing when the power controller turns on and off the system main body.

8. The computer system according to claim 1, wherein the extended unit has a slot for connecting the extended board to the system main body.

9. The computer system according to claim 1, wherein the resume mode set means has a flip-flop for keeping a resume set bit supplied from the system main body and outputting the resume set signal so as to effect the resume mode set upon turn-on of the system main body.

10. The computer system according to claim 1, wherein the voltage level detecting means has a level detecting circuit for detecting the power voltage level of the system main body, a delay circuit, and a logic gate circuit, the level detecting circuit outputting a signal which rises when the power voltage level is normal, the delay circuit outputting a signal delayed by a predetermined time period from the signal output from the level detecting circuit, and the logic gate circuit outputting the detection signal which rises at a leading edge of the signal output from the level detecting circuit and falls at a leading edge of the signal output from the delay circuit.

11. A computer system comprising:
a computer having a resume function for resuming, when the computer is turned on, a process interrupted owing to turning off the computer;
an extending unit removably electrically connected to the computer, the extending unit having an optional board and a power supply for supplying power to the optional board;
setting means for setting a resume mode for executing resume function in the computer;
storing means for storing a resume signal indicating that the resume mode is set in the computer;
outputting means for outputting the resume signal; and
preventing means responsive to the resume signal for preventing the extending unit from processing data when the resume signal is outputted.

12. A computer system according to claim 11, wherein the preventing means prevents the power supply from supplying the power to the optional board so as to inhibit data processing of the extending unit.

13. A computer system comprising:
a computer having a resume function for resuming when the computer is turned on, a process interrupted owing to turning off the computer, the computer having a first power supply;
an extending unit removably connected to the computer for extending a function of the computer, the extending unit having a second power supply;
setting means for setting a resume mode for executing the resume function in the computer;
a memory storing resume data and a resume status for indicating that the resume mode is set in the computer;
an outputting circuit for outputting a signal in accordance with the resume data stored in the memory to the extending unit when the first power supply is on; and
a preventing circuit for preventing the extending unit from operating, even if the second power supply is on, while the signal is output to the extending unit.

14. A computer system according to claim 13, wherein the extending unit removably stores an optical board for extending a function of the computer, and the optional board is supplied with power from the second power supply.

15. A computer system according to claim 14, wherein the preventing circuit prevents the second power supply from supplying the power to the optional board so as to inhibit the operation of the extending unit while the signal is output to the extending unit.

* * * * *